Patented Dec. 19, 1939

2,184,167

UNITED STATES PATENT OFFICE 2,184,167

MANUFACTURE OF DIHYDROFOLLICLE HORMONES BY FERMENTATIVE REDUCTION

Walter Schoeller, Berlin-Charlottenburg, Germany, assignor to Schering Corporation, Bloomfield, N. J., a corporation of New Jersey No Drawing. Application February 12, 1938, Serial No. 190,226. In Germany February 16, 1937

9 Claims. (Cl. 195—51)

This invention relates to a process for the manufacture of dihydrofollicle hormones and analogues of the same containing less hydrogen, as well as their derivatives, such as esters, ethers and the like and is an improvement in or modification of the inventions of U. S. applications Ser. No. 694,686 filed October 21, 1933, now Patent No. 2,096,744, issued October 26, 1937, and Ser. No. 52,084 filed November 29, 1935, now Patent No. 2,072,830, issued March 2, 1937.

The said specifications describe the reduction of the keto group of the follicle hormone, or analogues of the same containing less hydrogen, such as equilin, or its derivatives, such as esters, ethers and the like by means of chemical methods, including catalytic methods and the use of nascent hydrogen, whereby a mixture of isomeric dihydrofollicle hormones, or analogues of the same containing less hydrogen, or their derivatives is produced. By the application of these chemical methods there is produced not only a mixture of isomers which possess different physiological activity value, but also the danger arises that by unsuitable selection of the reduction conditions the aromatic six-membered ring in the hormone molecule may be hydrogenated and thereby the follicle hormone action lost.

In accordance with the present invention by the application of enzymatic or phytochemical reduction methods as are summarized for example in Oppenheimer, Methoden der Fermente 1929, page 1212, by Neuberg & Gorr, not only is the danger of hydrogenation of the aromatic nucleus avoided, but also, by reason of the asymmetrical course of the phytochemical reduction, there is produced, in a most surprising manner, in general only one perfectly definite physiologically active optical isomer.

According to the invention there is in fact obtained by the reduction of the follicle hormone essentially the highly active trans- form of the dihydrofollicle hormone, whereas the hitherto known reduction methods in general lead to mixtures of cis- and trans- compounds.

Although the application of the phytochemical reduction methods for the conversion of ketones into alcohols is not novel per se, yet in the present case its application for the production of physiologically active substances with quite definite optical properties and of highest purity constitutes a valuable chemical achievement.

The following example illustrates the invention:

Example 100 grams of invert sugar, 600 ccs. of water and 50 grams of yeast are mixed. Into the mixture, which has entered into brisk fermentation, are allowed to drop gradually with shaking 330 mg. of follicle hormone dissolved in 40 ccs. of alcohol. After the whole has been introduced, the mixture is allowed to ferment further at ordinary temperature (18–20°) for about 40–45 hours longer and then 20 grams of invert sugar, 200 ccs. of water and 20 grams of yeast are introduced. After about 90 hours the fermentation is complete, which can be ascertained by the now only weak reduction capacity of the solution for Fehling's solution; the liquid is then poured off from the yeast and both extracted several times with ether. The combined ether solutions are evaporated the dry residue taken up with alcohol, and from the alcoholic solution any unchanged follicle hormone separated as semicarbazone in the known manner. The residue remaining after the evaporation of the semicarbazone mother liquors is purified by recrystallization from alcohol, if desired after a high vacuum distillation and in this manner the highly physiologically active dihydrofollicle hormone of M. P. 174° C. obtained.

Of course, the recovery of the reduced compounds from the fermentation mixture can be carried out in another manner from that described above as is evident to a chemist familiar with the art of enzymatic reduction. Likewise many other changes and variations in the reduction conditions, the microorganisms employed and the like may be made in accordance with the principles set forth herein and in the claims annexed hereto.

One may also work in the presence of known fermentation activators such as salts, for instance primary or secondary sodium phosphate, calcium carbonate and the like, or nitrogenous compounds that cause a more rapid development of the yeast and the like.

In a similar manner as described above, reduction products wherein the carboxyl group is converted into a secondary alcohol group are obtained by employing as starting material equilin or equilenin, oestron-benzoate or acetate or propionate or other esters, triphenylmethyl-, benzyl- or other ethers, or other derivatives, whereby in the case of the derivatives splitting off of the substituent frequently takes place leaving the free oestradiols.

What I claim is:

1. Process for the manufacture of dihydrofollicle hormone and its unsaturated analogues dihydroequilin and dihydroequilenin, and their derivatives, comprising subjecting a member of the group consisting of follicle hormone, equilin, equilenin and their 3-derivatives to an enzymatic or phytochemical reduction until the keto group has been converted to a secondary alcohol group.

2. Process as claimed in claim 1 comprising introducing the starting material into a medium wherein a reducing fermenation takes place.

3. Process as claimed in claim 1 wherein the starting material is introduced into a medium wherein a reducing fermentation with yeast takes place.

4. Process as claimed in claim 1 wherein the starting material is enzymatically reduced by fermentation by means of a suspension of fermenting micro-organisms in a sugar solution.

5. Process as claimed in claim 1 wherein the starting material is enzymatically reduced by fermentation of a sugar solution by means of yeast.

6. Process as claimed in claim 1 comprising introducing the starting material into a medium wherein a reducing fermentation takes place, said medium containing an activator capable of activating fermentation.

7. Process as claimed in claim 1 comprising introducing the starting material into a medium wherein a reducing fermentation takes place, said medium containing an activator capable of activating fermentation and selected from the group of salts consisting of primary and secondary sodium phosphate and calcium carbonate.

8. Process for the manufacture of dihydrofollicle hormone and its unsaturated analogues dihydroequilin and dihydroequilenin, and their derivatives, comprising gradually introducing a solution of a member of the group consisting of follicle hormone, equilin, equilenin and their 3-derivatives into an aqueous suspension of sugar and yeast, allowing the mixture to ferment, thereafter extracting the mixture by means of an organic solvent wherein the partially hydrogenated hormone is soluble, and isolating the hormone from said extract.

9. Process as claimed in claim 8 wherein unreacted starting material is removed from the extract by converting the same into a relatively insoluble condensate with a ketone reagent, and recovering the reduction product.

WALTER SCHOELLER.